US009827743B2

(12) United States Patent
Fujita et al.

(10) Patent No.: US 9,827,743 B2
(45) Date of Patent: Nov. 28, 2017

(54) COMPOSITE MATERIAL AND METHOD OF MAKING THE SAME

(71) Applicant: SUBARU CORPORATION, Tokyo (JP)

(72) Inventors: Hiroyasu Fujita, Tokyo (JP); Naoyuki Sekine, Tokyo (JP); Ai Kawashima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 3 days.

(21) Appl. No.: 15/065,527

(22) Filed: Mar. 9, 2016

(65) Prior Publication Data

US 2016/0279903 A1   Sep. 29, 2016

(30) Foreign Application Priority Data

Mar. 26, 2015   (JP) .................. 2015-063641

(51) Int. Cl.
*B32B 3/10* (2006.01)
*B32B 15/04* (2006.01)
(Continued)

(52) U.S. Cl.
CPC ............ *B32B 15/04* (2013.01); *B32B 3/02* (2013.01); *B32B 3/06* (2013.01); *B32B 3/08* (2013.01); *B32B 5/00* (2013.01); *B32B 5/02* (2013.01); *B32B 5/022* (2013.01); *B32B 5/06* (2013.01); *B32B 5/10* (2013.01); *B32B 5/12* (2013.01); *B32B 5/22* (2013.01); *B32B 5/24* (2013.01); *B32B 5/26* (2013.01); *B32B 5/28* (2013.01); *B32B 7/00* (2013.01); *B32B 7/02* (2013.01); *B32B 7/04* (2013.01); *B32B 7/10* (2013.01); *B32B 9/00* (2013.01); *B32B 9/04* (2013.01); *B32B 15/00* (2013.01); *B32B 15/14* (2013.01);
(Continued)

(58) Field of Classification Search
None
See application file for complete search history.

(56) References Cited

U.S. PATENT DOCUMENTS

| | | | |
|---|---|---|---|
| 7,735,906 B2 * | 6/2010 | Takahashi | B62D 25/04 296/187.02 |
| 2011/0089958 A1 | 4/2011 | Malecki et al. | |
| 2016/0016609 A1 * | 1/2016 | Kurokawa | B62D 21/02 296/203.01 |

FOREIGN PATENT DOCUMENTS

| | | |
|---|---|---|
| EP | 2848946 A1 | 3/2015 |
| EP | 2873970 A1 | 5/2015 |

(Continued)

OTHER PUBLICATIONS

Notice of Reasons for Refusal received in corresponding Japanese Application No. 2015-063641, dated Jul. 12, 2016.
(Continued)

*Primary Examiner* — Christopher Polley
(74) *Attorney, Agent, or Firm* — McDermott Will & Emery LLP

(57) ABSTRACT

A composite material includes laminated composite material sheets having conductivity, partitioning members provided between end parts of sets of the composite material sheets to mutually separate the sets of the composite material sheets, and metal sheets respectively provided in the separated end parts of the composite material sheets so as to be respectively pinched between the composite material sheets.

19 Claims, 14 Drawing Sheets

(51) Int. Cl.

| | |
|---|---|
| *B32B 5/00* | (2006.01) |
| *B32B 5/02* | (2006.01) |
| *B32B 5/06* | (2006.01) |
| *B32B 5/10* | (2006.01) |
| *B32B 5/12* | (2006.01) |
| *B32B 5/22* | (2006.01) |
| *B32B 5/24* | (2006.01) |
| *B32B 5/26* | (2006.01) |
| *B32B 5/28* | (2006.01) |
| *B32B 7/00* | (2006.01) |
| *B32B 7/02* | (2006.01) |
| *B32B 7/04* | (2006.01) |
| *B32B 7/10* | (2006.01) |
| *B32B 9/00* | (2006.01) |
| *B32B 9/04* | (2006.01) |
| *B32B 15/00* | (2006.01) |
| *B32B 15/14* | (2006.01) |
| *B32B 19/00* | (2006.01) |
| *B32B 19/02* | (2006.01) |
| *B32B 19/04* | (2006.01) |
| *B32B 27/00* | (2006.01) |
| *B32B 27/06* | (2006.01) |
| *B32B 27/12* | (2006.01) |
| *B32B 27/18* | (2006.01) |
| *B32B 27/28* | (2006.01) |
| *B32B 3/02* | (2006.01) |
| *B32B 3/06* | (2006.01) |
| *B32B 3/08* | (2006.01) |
| *B32B 37/06* | (2006.01) |
| *B32B 37/10* | (2006.01) |

(52) U.S. Cl.
CPC .............. *B32B 19/00* (2013.01); *B32B 19/02* (2013.01); *B32B 19/04* (2013.01); *B32B 27/00* (2013.01); *B32B 27/06* (2013.01); *B32B 27/12* (2013.01); *B32B 27/18* (2013.01); *B32B 27/28* (2013.01); *B32B 37/06* (2013.01); *B32B 37/10* (2013.01); *B32B 2250/00* (2013.01); *B32B 2262/00* (2013.01); *B32B 2262/02* (2013.01); *B32B 2262/106* (2013.01); *B32B 2305/07* (2013.01); *B32B 2305/076* (2013.01); *B32B 2307/10* (2013.01); *B32B 2307/20* (2013.01); *B32B 2307/202* (2013.01); *B32B 2307/30* (2013.01); *B32B 2307/302* (2013.01); *B32B 2307/50* (2013.01); *B32B 2457/00* (2013.01); *B32B 2605/00* (2013.01); *B32B 2605/08* (2013.01); *B32B 2605/18* (2013.01)

(56) References Cited

FOREIGN PATENT DOCUMENTS

| | | |
|---|---|---|
| JP | 05-269874 A | 10/1993 |
| JP | 2002-225166 A | 8/2002 |
| JP | 2013-050306 A | 3/2013 |
| JP | 2013-053858 A | 3/2013 |
| JP | 2013-508722 A | 3/2013 |
| JP | 2015-194461 A | 11/2015 |

OTHER PUBLICATIONS

Extended European Search Report issued in corresponding EP Application No. 16159589.7, dated Jul. 5, 2016.
T. Nishi, "Electric Current Discharge Visualization Testing Method for Fuel-Tank Structure of Aircraft, Involves Imaging Prresence or Absence of Ignition Source in MicroGap by Allowing Electric Current Between Composite Material and Fastener", vol. 2013, No. 21, XP002737325 (Mar. 14, 2013).
H. Fujioka et al., "Fiber-Reinforced Plastics Heat Generating Body for Wind Power Generator has Electrical Path Which Consists of First Layer, Connection Unit, and Second Layer Equipped With Power Supply That Sends Electric Current", vol. 2013, No. 62, XP002737326 (Sep. 6, 2013).
Decision to Grant issued in corresponding Japanese Patent Application 2015-063641, dated Oct. 4, 2016.

\* cited by examiner

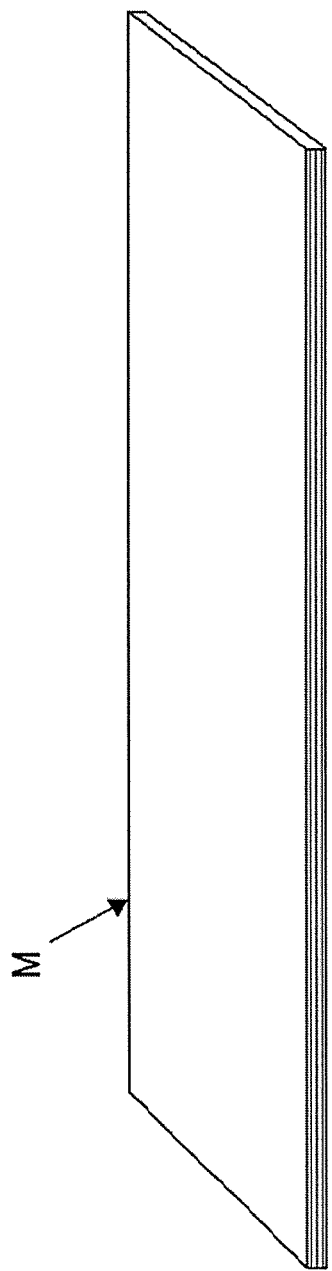

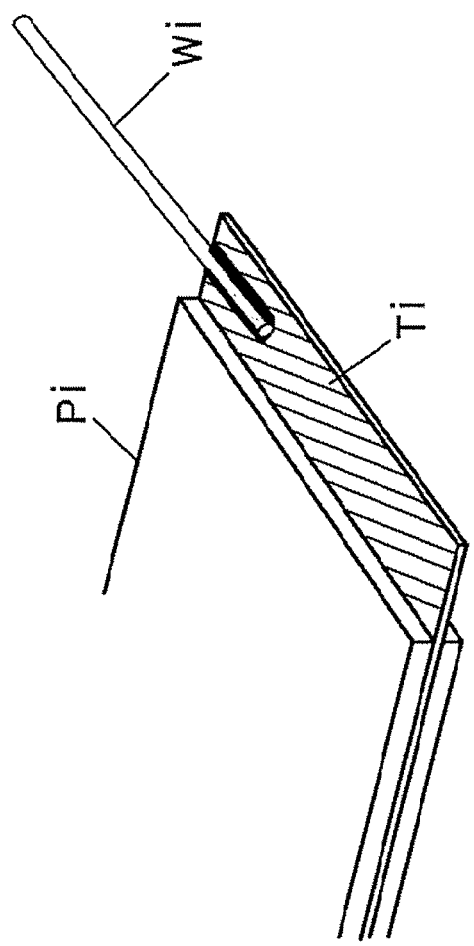

COMPOSITE MATERIAL AND METHOD OF MAKING THE SAME

CROSS-REFERENCE TO RELATED APPLICATION

The present application claims priority from Japanese Patent Application No. 2015-063641 filed on Mar. 26, 2015, the entire contents of which are hereby incorporated by reference.

BACKGROUND

1. Technical Field

The present disclosure relates to a laminated-type composite material containing conductive fibers and resin, where electric current flowing through the composite material is measurable. The present disclosure also relates to a method of making the composite material.

2. Related Art

In recent years, applications of composite materials, such as carbon fiber reinforced plastics (CFRPs), to structures have been expanded. For example, the composite materials are applied to a wide range of fields, such as aircraft fuselages, automobile frames, and windmill blades. The composite material contains conductive fibers, such as carbon fibers. Therefore, when a short-circuit, a thunderstrike, etc. occurs, the composite material could function as a current path which is not intended from a design of the structure. For example, since aircraft fuel easily catches fire by a spark caused by the thunderstrike, it is important to clarify a current distribution in the fuselage at the time of the thunderstrike.

SUMMARY OF THE INVENTION

However, since the composite material, especially containing conductive fibers, such as the carbon fiber reinforced plastic (CFRP), is comprised of carbon fibers which are electrically conductive and resin or plastic which is an insulator, the composite material is easily influenced by layout direction(s) of the fibers. Therefore, the composite material is complicated in the current path compared with metallic materials. Especially, in a case of a carbon fiber laminated plate comprised of a plurality of carbon fiber layers which are laminated so that directions of the fibers differ, the current path becomes more complicated. Therefore, an art which can measure the current flowing through the composite material more accurately is needed. Similarly, the art which can measure the current is also desired for composite materials comprised of fibers which are nonconductive and resin or plastic which is conductive (e.g., conductive resin or resin where conductive material(s) are kneaded or mixed).

Conventionally, Japanese Unexamined Patent Application Publication (JP-A) No. 2013-050306 and Japanese Unexamined Patent Application Publication (JP-A) No. 2013-053858 disclose arts which measure a behavior and magnitude of current flowing through a composite material, for example. Among these, one art disclosed in JP-A No. 2013-050306 can visualize a partial electric discharge when current flows through the composite material provided with a fastener. Further, the other art disclosed in JP-A No. 2013-053858 can measure current in a carbon fiber laminated plate comprised of a plurality of carbon fiber layers which are laminated so that directions of the fibers differ.

As described above, the art disclosed in JP-A No. 2013-050306 can visualize the partial electric discharge. Further, the art disclosed in JP-A No. 2013-053858 can measure the current distribution of the composite material in the plate surface directions. However, neither arts can measure current in off-plate directions which intersect with the plate surface of the composite material. In addition, a propagation mechanism of the current in the composite material in the off-plate directions has not been theoretically clarified.

Therefore, the present inventors invented and filed previously as Japanese Patent Application (JP) No. 2014-172183, a suitable test specimen in order to clarify the propagation mechanism of the current in the off-plate directions of a composite material used for a structure, such as an aircraft fuselage, and a method of measuring the current. In the above-described art, end parts of the layers of the composite material are separated or exfoliated mutually. Thus, in order to provide electrodes in the end parts, the end parts are first removed (e.g., sanded, grinded or etched) before metal layers which serve as the electrodes are formed by plating. Therefore, it became clear by subsequent analyses that contact resistances in the electrodes and variations thereof are large, the formation of the electrodes is troublesome, and the making of the test specimen requires a long period of time.

It is desirable to provide a composite material which allows measurements of currents flowing through layers, and has lower contact resistances in electrode parts and smaller variations thereof and, thus, homogeneous current can be applied from the electrode parts. It is also desirable to provide a method of making with a suitable reproducibility and efficiency the composite material which allows the measurements of the currents flowing through the layers and is provided with the electrode parts for applying the current to the layers.

An aspect of the present disclosure provides a composite material that includes laminated composite material sheets having conductivity, partitioning members provided between respective end parts of sets of the composite material sheets to mutually separate the sets of the composite material sheets, and metal sheets respectively provided in the separated end parts of the composite material sheets so as to be respectively pinched between the composite material sheets.

The sets of the composite material sheets may each have a strip shape and have a different length, and the sets of the composite material sheets are laminated so that end parts where the partitioning members are not provided are aligned, while the partitioning members that mutually separate the composite material sheets are provided between the end parts where the partitioning members are provided. The metal sheets are provided in the respective separated end parts of the sets of the composite material sheets so as to be respectively pinched between the sets of the composite material sheets.

Another aspect of the present disclosure provides a composite material that includes laminated composite material sheets having conductivity, partitioning members provided between the composite material sheets in end parts of the composite material sheets to mutually separate the composite material sheets, and metal sheets respectively joined to at least one of a front surface and a rear surface of the separated end part of the composite material sheet.

Sets of the composite material sheets may each have a strip shape and have a different length, and the sets of the composite material sheets may be laminated so that end parts where the partitioning members are not provided are aligned, while the partitioning members that mutually separate the sets of the composite material sheets may be provided between the end parts where the partitioning members are provided. The metal sheets may be joined to at least one of the front surface and the rear surface of the respective separated end part of the sets of the composite material sheet.

The composite material may further include a common lead coupling part to which a common lead that applies current to the composite material is electrically coupled. The common lead coupling part may be provided in a part of the composite material where the composite material sheets are not separated.

Another aspect of the present disclosure provides a composite material that includes a first composite material, a second composite material, a partitioning member, and metal sheets. The first and second composite materials are formed by laminating composite material sheets having conductivity. The first composite material and the second composite material are overlapped with each other and coupled to a conductor that is provided so as to penetrate both the composite materials. The partitioning member is provided in an end part of the second composite material. The end part is on a side opposite to a side where the second composite material is coupled to the first composite material. The composite material also includes metal sheets provided in the end parts of the respective composite material sheets that constitute the second composite material. The end parts are on the side opposite to the side where the second material is coupled to the first composite material, and the metal sheets are pinched between the respective end parts.

Another aspect of the present disclosure provides a composite material that includes a first composite material, a second composite material, a partitioning member, and material sheets. Each composite material is formed by laminating composite material sheets having conductivity, and the first composite material and the second composite material are overlapped with each other and coupled to a conductor that is provided so as to penetrate both the composite materials. The partitioning member is provided in the second composite material. The metal sheets are joined to at least one of a front surface or a rear surface of end parts of the respective composite material sheets that constitute the second composite material. The end parts are on a side opposite to a side where the second material is coupled to the first composite material.

A common lead coupling part to which a common lead that applies current to the composite material is electrically coupled may be formed in the first composite material.

The composite material sheet may contain conductive fibers.

Another aspect of the present disclosure provides a method of making a composite material that includes forming, laminating, and molding prepreg pairs. In the forming, each prepreg pair is formed by pinching a metal sheet between two composite material prepregs having conductivity at one of end parts of the composite material prepregs so that the metal sheet is partially protruded from the end parts of the composite material prepregs. In the laminating, the prepreg pairs are laminated with a partitioning member being pinched between end parts the prepreg pairs. In the molding, the laminated prepreg pairs are molded by pressurizing and heating them.

The method of making the composite material may further include coupling one end of a lead to each of the protruded parts of the metal sheets from the end parts of the prepreg pairs, after molding the laminated prepreg pairs.

Another aspect of the present disclosure provides a method of making a composite material that includes laminating composite material prepregs having conductivity so that a metal sheet and a partitioning member are pinched between respective ones of end parts of the composite material prepregs, and molding the laminated composite material prepregs by pressurizing and heating the laminated composite material prepregs. The laminating of the composite material prepregs may include joining the metal sheets to the ones of end parts of the composite material prepregs so that the metal sheets are at least partially exposed from the end parts.

The method of making the composite material may further include coupling one end of a leads to each of the exposed parts of the metal sheets from end parts of the composite material prepregs after molding the laminated composite material prepregs.

The method of making the composite material further includes, as a pretreatment, forming fine irregularity on the surfaces of the metal sheets using a predetermined etching agent, before forming the composite material prepregs.

The composite material prepreg may contain conductive fibers.

BRIEF DESCRIPTION OF THE DRAWINGS

The present disclosure is illustrated by way of example and not by way of limitation in the figures of the accompanying drawings, in which like reference numerals indicate like elements and in which:

FIGS. 1A and 1B illustrate a composite material to which a current measuring method according to a first implementation is applied, and a test specimen (test piece) for the method;

FIGS. 2A, 2B and 2C illustrate example structures of an end part of each CFRP layer of the test specimen illustrated in FIGS. 1A and 1B, and example couplings of a lead to an electrode part;

DETAILED DESCRIPTION

Hereinafter, implementations of a test specimen made of a composite material, a current measuring method, and a making method according to the present disclosure are described with reference to the accompanying drawings. Note that in the following description, although the test specimen is used for measuring currents in order to measure a current distribution etc. in a stage before a final product, this implementation is also applicable to a composite material as the final product.

First Implementation

Figure 1B:
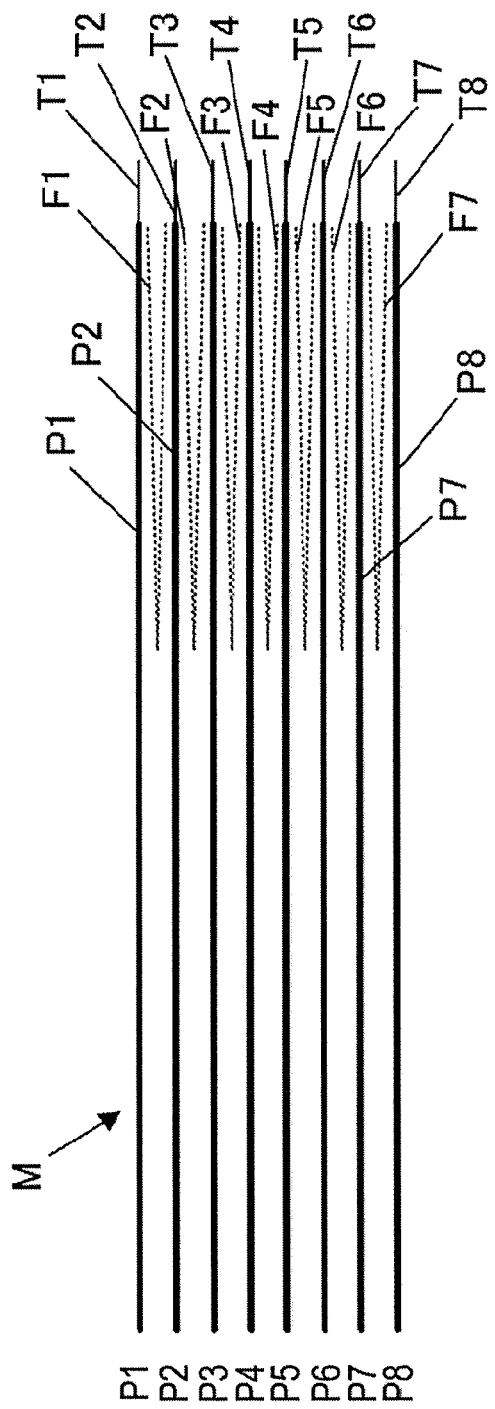

FIGS. 1A and 1B are views illustrating a test specimen (test piece) made of a composite material to which a current measuring method according to a first implementation is applied. The composite material to be measured is a fiber reinforced plastic in which resin or plastic is reinforced by conductive fibers, and in this implementation, it is a carbon fiber reinforced plastic (CFRP) containing carbon fibers. As illustrated in FIG. 1A, a test specimen M has a strip shape.

The test specimen M is comprised of a composite material in which eight pairs of prepreg sheets (16 prepreg sheets in total) which are composite material sheets soaked or impregnated in non-hardened (non-cured) resin, are laminated and molded into prepreg layers P1-P8. Each composite material sheet is formed by laying out plural bundles of carbon fibers in predetermined direction(s). The thickness of each prepreg to laminate may be equal to or less than 1 mm (e.g., 0.2 mm) Note that the teem "prepreg sheet" as used herein may also be referred to as "prepreg." Although the carbon fibers in each prepreg layer can be laid out in any directions, each pair of the prepreg sheets is desirably laid out in the same direction. Note that the prepreg which constitutes the test specimen M is selected from those corresponding to the actual composite material structure which is considered to be used for an aircraft etc. The number of laminated prepreg sheets is not limited to eight layers (or total of 16 sheets), and is arbitrarily selected according to the actual composite material structure.

Figure 2A:
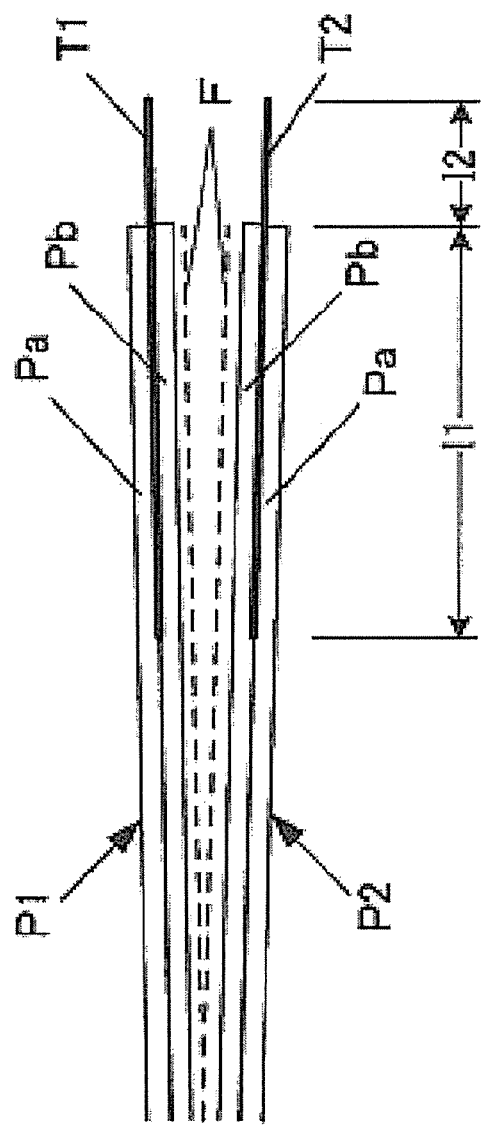

Furthermore, for example, as illustrated in FIG. 1B, partitioning members F1-F7 are disposed in the test specimen M of this implementation between the respective prepreg layers P1-P8, from one end toward the center of the prepreg layers (from the right in FIG. 1B). In addition, metal sheets T1-T8 used as electrodes are provided to the end parts of the prepreg layers P1-P8. As the end parts being enlarged in FIG. 2A, a pair of prepregs Pa and Pb is consisted of two layers among the prepreg layers P1, P2, .... A metal sheet (T1, T2, ...), such as a copper foil, used as the electrode is disposed between the end parts of each paired prepregs Pa and Pb. The partitioning members F1-F7 are folded in half and disposed between the respective prepreg layers P1-P8.

Thus, the prepreg layers P1-P8, the metal sheets T1-T8, and the partitioning members F1-F7 are laminated, and are then pressurized and heated (cured) to mold the test specimen of the composite material in which the end parts of the respective layers are separated and the electrodes are provided. The metal sheets T1-T8 used as the electrodes are formed so as to have, for example, a length 11 of an overlapping area with the prepregs is about 4 cm, a length 12 of a projecting area from the ends of the prepregs is about 1 cm. Note that 11 and 12 are not limited to such numerical values. The thickness of the metal sheets T1-T8 used as the electrodes may be equal to or less than 70 μm if the metal sheets are the copper foils. In order to improve adhesivity with the prepregs, the surfaces of the metal sheets T1-T8 are desirable to be grinded or sanded, or etched using acid before molding comprised of pressurizing and heating.

The metal sheet T1-T8 may have a thickness with a enough strength to sustain a load when leads are coupled thereto, and the usable thicknesses are different depending on the type of metal which constitutes the metal sheets. Although a copper foil is most suitable for a metal sheet, other materials such as an aluminum foil may be used alternatively.

Figure 2B:
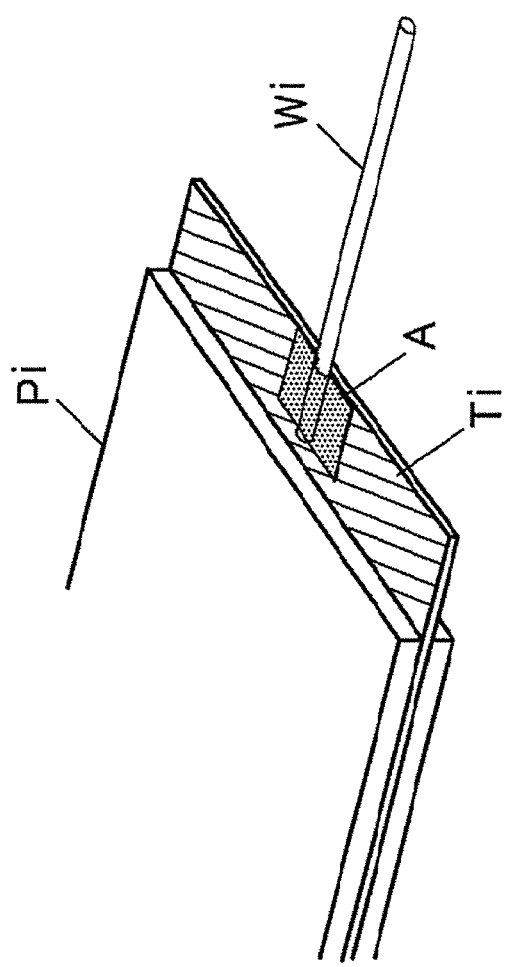

Further, in order to measure current of each prepreg layer Pi (i=1, 2, ..., 8) of the test specimen after molding, for example, as illustrated in FIG. 2B, resin A having conductivity such as conductive silver paste is applied to the surface of an end part of the metal sheet Ti (exposed part) so as to contact an end of a lead Wi. Thus, although the lead Wi can be coupled to the end part of the metal sheet Ti, it is desirable to etch the surface of the end part (exposed part) of the metal sheet Ti by acid, such as sulfuric acid, in order to have a suitable coupling. As illustrated in FIG. 2C, the lead Wi may be coupled by soldering to the surface of the metal sheet Ti which is the electrode part exposed from the end part of the prepreg layer Pi.

As illustrated in FIG. 1B, films as the partitioning members (hereinafter, referred to as "the mold releasing films") F1-F7 to which an easy-to-remove processing is applied on both sides intervene between the respective layers as a particular method of the mold release processing for the end parts. The mold releasing films F1-F7 extend over a predetermined length from one ends of the layers in a longitudinal direction toward the center. In addition, in this implementation, each of the mold releasing films F1-F7 is folded in half, and then inserted between the respective layers. In a case where the mold releasing film is not folded and is in a state of a single flat sheet of film, the film may adhere to the surface of the prepreg and the prepregs of the adjacent layers would be difficult to be separated or peeled if the easy-to-remove processing is unevenly done. Therefore, "folding in half" is to prevent this inconvenience. However, the mold releasing film is not limited to being folded in half, but may be the single flat sheet of film without being folded.

The mold releasing film is desirable to be made of insulating material having heat resistance, for example, Kapton® which is one of polyimide. The easy-to-remove processing applied to the surface of the mold releasing film is, for example, an application of Frekote® as a mold releasing agent. The mold releasing agent to apply is not limited to Frekote® but may be an insulating material having heat resistance. Note that the partitioning member is not limited to the mold releasing film but may also be made of an insulating material such as silicone rubber, or may also be a metal sheet, etc. applied with a mold releasing agent to the surfaces thereof. Further, the partitioning member is not limited to the thin sheet member, but may be a wedge-shaped or plate-shaped resin or metal jig to which the mold releasing agent is applied on the surfaces.

As described above, the test specimen made of CFRP is made by intervening and laminating the partitioning members, such as the mold releasing films, on one sides of the prepreg layers P1-P8 between the respective layers, and heating the prepreg layers P1-P8 in the pressurized state to cure the resin. Then, as described above, the test specimen is completed by coupling the lead Wi for applying measurement current to the electrode part (metal sheet Ti) in the end part of the separating side of each CFRP layer. In this implementation, after the test specimen is completed, the mold releasing films are removed to use the test specimen for an examination, but the mold releasing films may not be removed and may remain intervened. If the metal sheets are used as the partitioning members, it is preferred that the metal sheets are removed after the completion of making the test specimen. After the partitioning member is removed, it is preferred to insert insulating members into the respective layers in order to secure the insulation between the respective layers for the measurement.

Note that, as described above, the method of making the test specimen is not limited to the method comprised of laminating the plurality of prepregs and curing the resin, but may be any other making methods, such as RTM (Resin Transfer Molding) method. For example, VaRTM (Vacuum-assisted Resin Transfer Molding) method which is one kind of the RTM method is a molding method comprised of laying out a plurality of carbon fiber bundles in predetermined direction(s), then injecting liquefied resin into a vacuumed bag film where the carbon fiber bundles are entirely wrapped to impregnate the resin into the fibers, and heating in an oven to cure the resin. In order to making the test specimen having the above-described structure by the VaRTM method, the plurality of carbon fiber bundles is laid out in the predetermined direction, the plurality of partitioning members such as the mold releasing films is intervened on one side at a predetermined interval, and then the liquefied resin into the vacuumed bag film which wraps entirely is injected. Alternatively, the method of making the test specimen may be a technique by cold setting, such as wet layup. In this case, since the partitioning member does not require the heat resistance, a wide variety of materials therefor can be used.

In the art disclosed in JP No. 2014-172183 which was filed before the present disclosure, grinding or sanding processing which uses a file, sand paper, etc. to grind or sand the resin in the end part of each CFRP layer (composite material sheet) of the test specimen to expose the carbon fibers is performed before coupling the lead to the CFRP layer. Then, the grinded part is plated. Here, a pretreatment which applies process fluid, such as sulfuric acid, may be carried out before the plating. However, the grinding or sanding processing is comparatively troublesome and reproducibility is low. In addition, it is difficult to fully lower the contact resistances, and the variations in the contact resistances are not small enough. On the other hand, according to the test specimen of this implementation, the process of forming the electrodes by the grinding or sanding processing etc. is not necessary because the composite material is molded in the state where the metal sheet which serves as the electrode is joined to the end part of each CFRP layer in advance. Therefore, there are advantages, such as a suitable reproducibility, a fully-lowered contact resistance, and a small variation of the contact resistance.

Figure 3A:
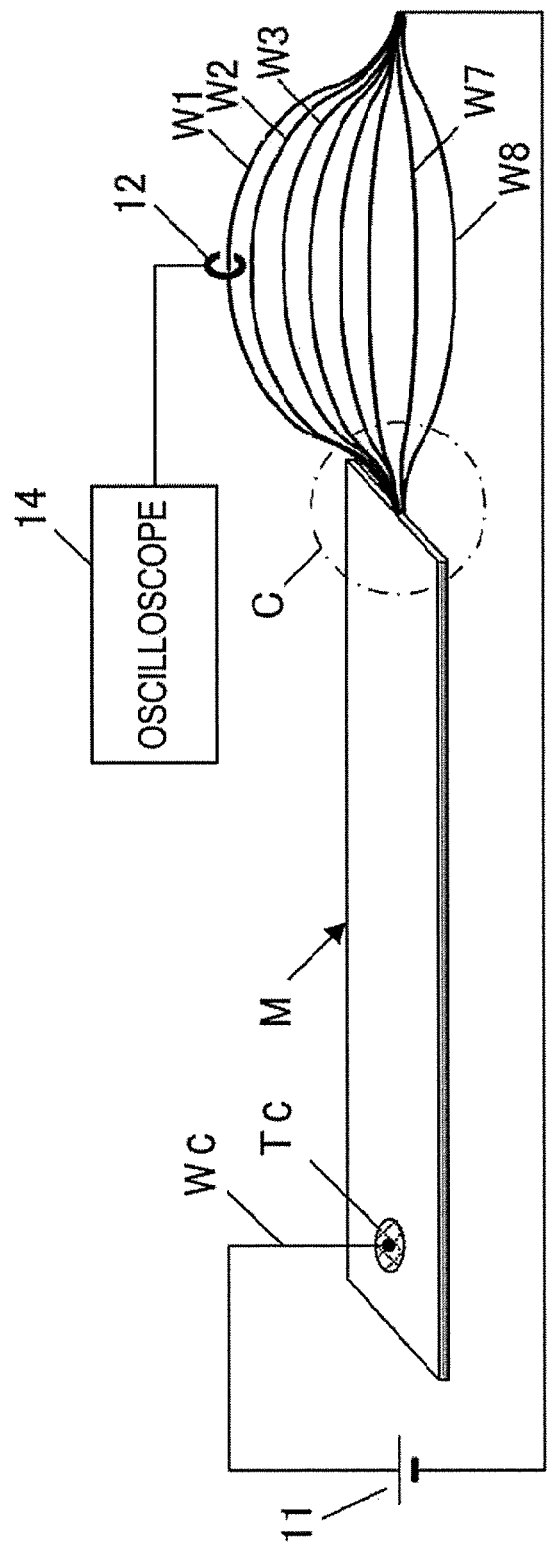
FIGS. 3A and 3B illustrate example measuring methods of current flowing through each CFRP layer of the test specimen.
Figure 3B:
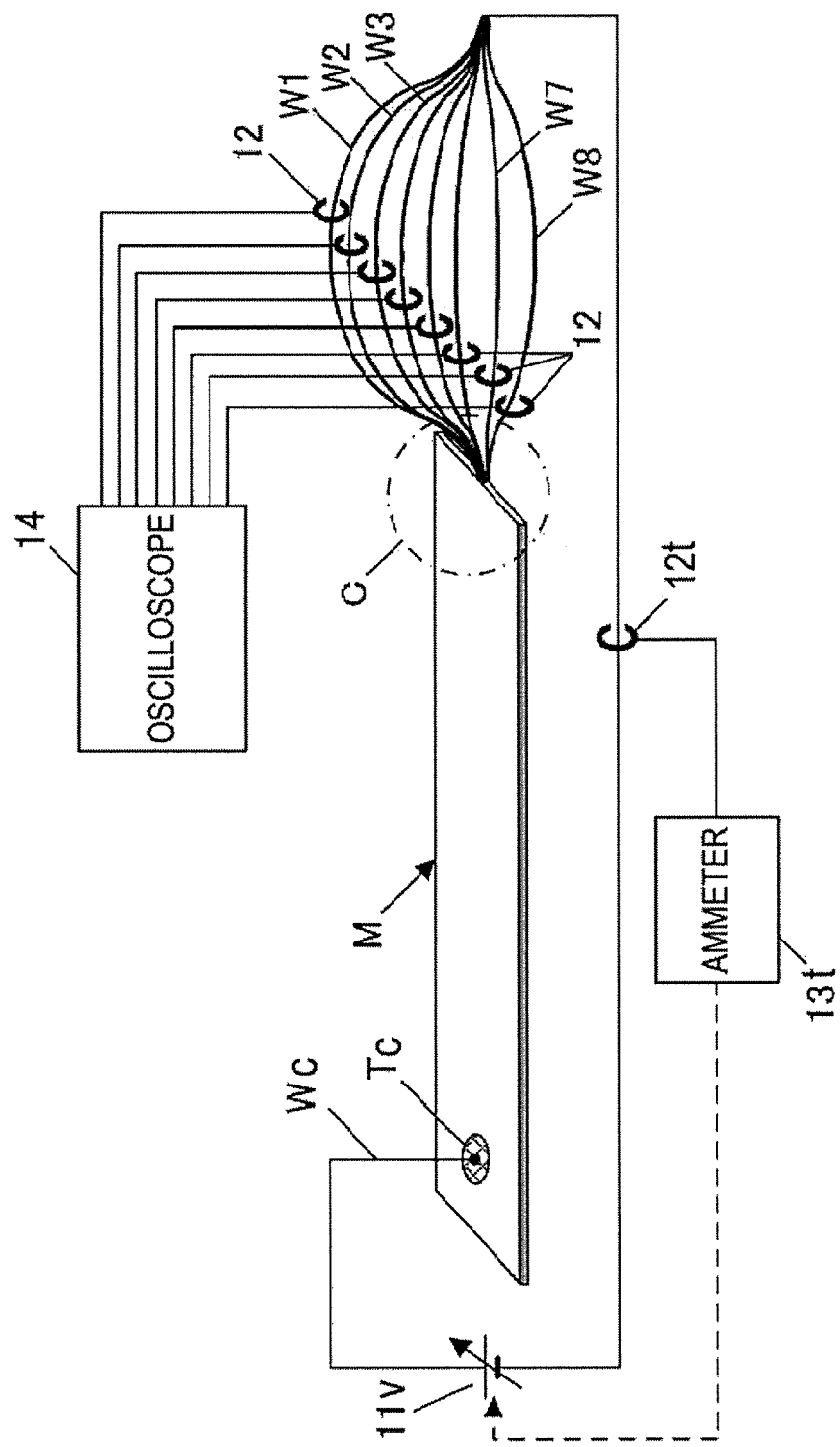
Figure 3C:
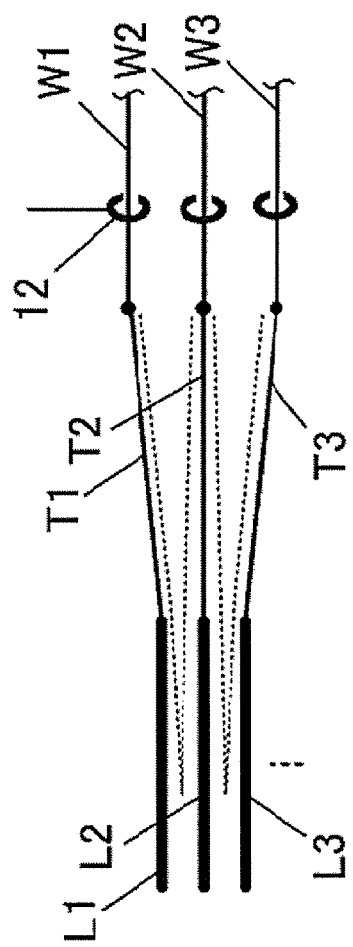
FIG. 3C is an enlarged view of a portion surrounded by dashed dotted circles C in FIGS. 3A and 3B.

Next, a structure of a current measuring device and a method of measuring current which use the test specimen made of the above-described composite material are described. FIGS. 3A to 3C schematically illustrate the current measuring device which uses the test specimen M as an object to be measured. As illustrated in FIGS. 3A and 3B, the current measuring devices include a direct current (DC) power supply 11, Rogowski coil(s) 12$t$ which detect currents flowing through the leads W1-W8 coupled to the end parts of the respective CFRP layers L1-L8 of the test specimen, and an oscilloscope 14 coupled to the Rogowski coil(s) 12$t$. Note that, if a current waveform which imitates a thunderstrike current (e.g., a waveform based on the standard specs of the thunderstrike waveform for an aircraft: SAE ARP 5412) is applied to the test specimen to examine the behavior of the current flowing, the Rogowski coil(s) 12$t$ corresponding to the frequency band of the thunderstrike waveform are coupled to the oscilloscope 14.

FIG. 3A illustrates one of the current measuring devices which measures the current flowing through each CFRP layer Li of the test specimen M. Thus, the current measuring device sequentially measures the currents while changing a target lead where the corresponding Rogowski coil 12$t$ is placed. Further, FIG. 3B illustrates another current measuring device which simultaneously measures the currents flowing through all the CFRP layers L1-L8 of the test specimen M, and the Rogowski coils 12$t$ are disposed on the leads W1-W8, respectively. FIG. 3C illustrates an enlarged view of a portion surrounded by dashed dotted circles C in FIGS. 3A and 3B, and the leads W1, W2, W3, . . . are coupled to the electrodes (metal sheets) T1, T2, T3, . . . in the end parts of the CFRP layer L1, L2, L3, . . . which are separated from each other.

Note that the Rogowski coils are annular coils which can measure large current. The Rogowski coils are disposed so as to surround measurement parts and are measurable of the currents based on voltages induced at both ends of the coils. The elements for current detection are not limited to the Rogowski coils, but may be any other current sensors, or resistance elements may be coupled to the leads W1-W8 in series and voltages caused between both terminals may be measured to calculate the currents. As illustrated in FIG. 3A, when the current is sequentially measured, a constant voltage (e.g., 5V) is applied from the DC power supply 11 each time to measure the value of current. On the other hand, as illustrated in FIG. 3B, if the currents flowing through all the layers L1-L8 are measured simultaneously, a DC power supply 11$v$ which can change the applied voltage is used in order to measure the current while adjusting the applied voltage so that the current values flowing through the entire target test specimen M are identical among the target test specimen M.

In any of the above-described measuring methods, a common electrode Tc is formed on a surface of the test specimen M in an opposite end part from the separating side, and a common lead Wc is coupled to the common electrode Tc. A method of coupling the common lead Wc may be comprised of sanding a part of the surface of the test specimen M (the part of "Tc"), bringing one end of the lead Wc into contact with the sanded part, applying conductive silver paste to the contact part, and heating the silver paste to be sintered. The electrode Tc may also be formed by plating after the sanding. In the measuring method of FIG. 3B, a Rogowski coil 12$t$ and an ammeter 13$t$ which detect current flowing through the entire test specimen M may be provided, and voltage of the variable DC power supply 11$v$ may be controlled so that the current measured by the ammeter 13$t$ approaches a predetermined value.

Although the conventional current measuring methods cannot derive a ratio of the currents flowing through the respective layers of the composite material (current distribution of the material in thickness directions), the ratio of the currents flowing through the respective layers can be derived if the test specimen as described in this implementation is used. Therefore, the current distribution of the composite material, which is actually planned to be used, in the thickness directions at the time of a thunderstrike can be estimated based on the current measuring result.

Moreover, for example, as for an aircraft application, more current is demanded to flow near the surface, or the current density at the layer(s) near the surface is demanded to be lowered, depending on where the material is used. In such a case, a material having different directions of the fibers can be selected in this implementation. Further, in a case where a composite material to be used has already been decided in terms of strength etc., and if the material has characteristics in which more current flows near the surface, this inconvenience can be addressed by joining a metal plate to the surface to lower the current density of the surface layer if the characteristics are known in advance.

Figure 4:
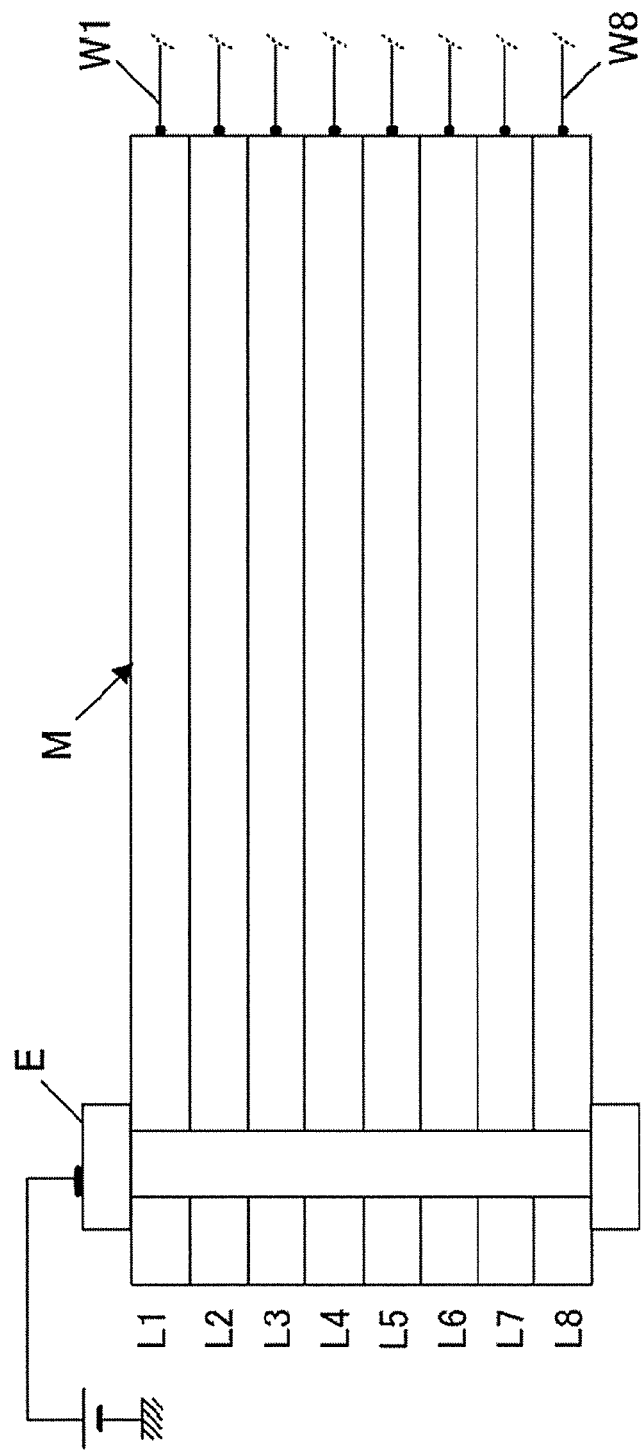
FIG. 4 illustrates one example of a coupling of a common lead to the test specimen illustrated in FIGS. 1A and 1B.
Figure 5:
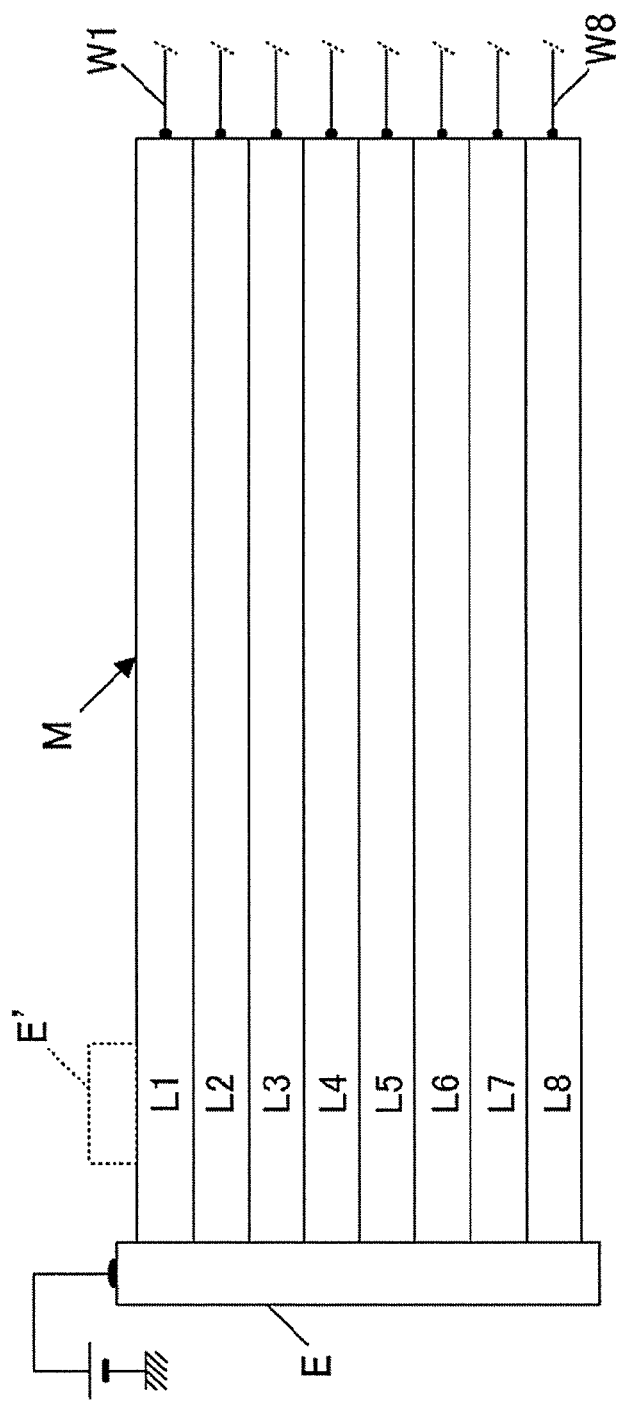
FIG. 5 illustrates another example of the coupling of the common lead to the test specimen illustrated in FIGS. 1A and 1B.

Note that a metal part called a fastener may be used in actual aircrafts for coupling the composite material. In such a case, since a current concentration occurs at a part of the fastener at the time of a thunderstrike, the current distribution with the fastener may also be demanded to be known in advance. Therefore, for example, as illustrated in FIG. 4, an electrode E as a conductive member which penetrates all the CFRP layers L1-L8 may be provided to apply current to the electrode E and measure currents flowing through the respective layers. Alternatively, as illustrated in FIG. 5, the electrode E is attached to an end face of the test specimen M opposite from the layer separating side to apply current to the electrode E and measure currents flowing through the respective layers. Note that, as illustrated in FIG. 5, a dashed line E' illustrates one example of an electrode to which current is applied from the surface of the test specimen M similar to one illustrated in FIGS. 3A to 3C. Further, a test specimen provided with a fastener at an intermediate part thereof may be created to measure a distribution of currents flowing through the respective layers in the case where the fastener exists.

Note that in the above-described implementation, although the test specimen M has the strip shape, it may be formed in other shapes, such as a rectangular shape. Further, although the common lead and the individual leads (WI-W8) to the test specimen M are coupled to the opposite ends of the test specimen M, they may be coupled to other locations of the test specimen M. For example, the common lead may be coupled to a center part of the test specimen M, or the CFRP layers are peeled in end parts of a plurality of sides and individual leads are coupled to the end parts, respectively. Further, in the above-described implementation, although the mold releasing films are used for peeling the CFRP layers from each other, but any other structure may be applicable, and, for example, the CFRP layers may be peeled by using a jig after the test specimen M is molded.

Second Implementation

Figure 6:
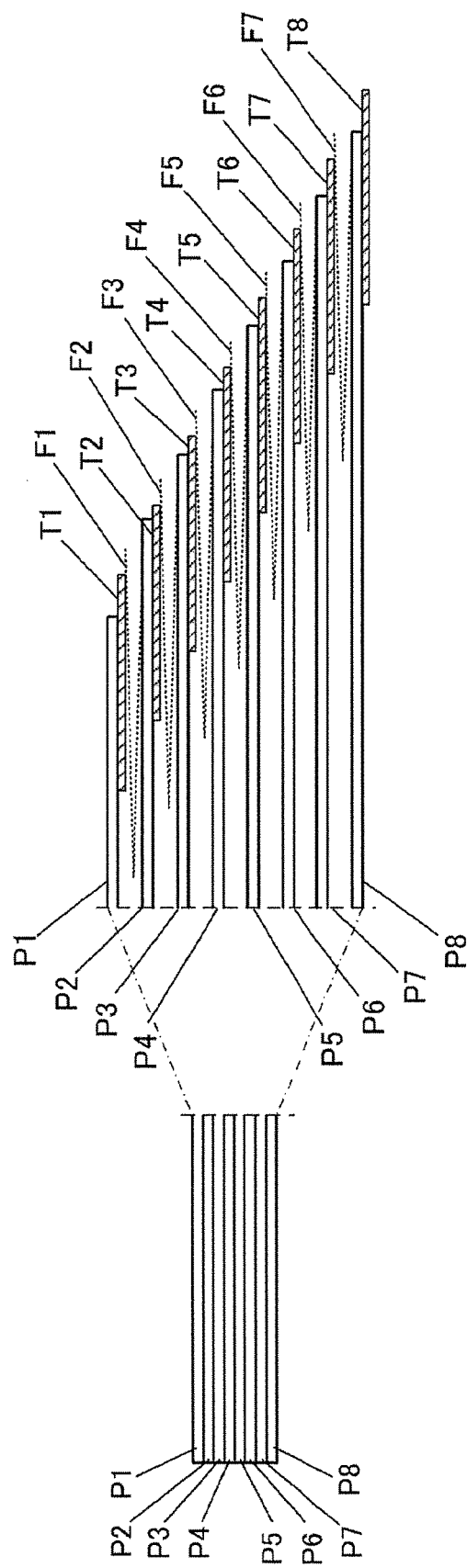
FIG. 6 illustrates a structure of a test specimen (test piece) which uses a composite material according to a second implementation.

FIG. 6 is a view illustrating a test specimen (test piece) made of a composite material according to a second implementation of the present disclosure. The composite material of this implementation is a fiber reinforced plastic, such as a carbon fiber reinforced plastic (CFRP), similar to the first implementation. In this implementation, as illustrated in FIG. 6, a plurality of laminated prepregs P1-P8 has different lengths so that one ends of the prepregs on the electrode formed side are offset (right side in FIG. 6). The other ends of the prepregs are aligned (left side in FIG. 6). Although each prepreg layer constituting the test specimen is comprised of two prepregs in the first implementation, each of the prepreg layers P1-P8 is comprised of a single sheet of prepreg in the second implementation. Although any offset amounts at the ends of the prepregs P1-P8 can be selected, the offset amounts may be selected from 5 mm to 50 mm, for example.

Further, metal sheets T1-T8 such as copper foils used as electrodes are joined to lower surfaces of end parts of the respective prepregs P1-P8 on the electrode formed side, and mold releasing films F1-F7 are sandwiched between the metal sheets T1-T7 and the end parts of the prepregs P2-P8, respectively. In the state where the prepregs P1-P8, the metal sheets T1-T8, and the mold releasing films F1-F7 are laminated, the laminated body is pressurized and heated to mold the test specimen made of the composite material in which the end parts of the layers are separated and the electrodes are formed. Note that the prepregs P1-P8 may be laminated in the paired-up manner, respectively, and the metal sheets T1-T8 may be sandwiched between the end parts, similar to the first implementation. Note that each mold releasing film is not limited to being folded in half, but it may be a single flat sheet without being folded.

As described above, since the test specimen is constructed so that the prepregs have different lengths to offset the overlapping positions of the metal sheets, stepped parts are offset. Therefore, there are advantages that the thickness at the end of the test specimen on the electrode formed side can be thinner compared with the test specimen of the first implementation and, thus, handling of the test specimen becomes easier. Note that, also in the second implementation, the thickness of each layer of the prepregs P1-P8 may be equal to or less than 1 mm (e.g., 0.2 mm). Further, any directions of the carbon fibers in the respective layers of the prepregs P1-P8 can be selected and, for example, directions corresponding to the actual structure of the composite material which are considered to be used for an aircraft etc. are selected. Further, any numbers of prepregs may be laminated and, for example, the number corresponding to the actual structure of the composite material is selected. Note that a current measuring method for the test specimen (test piece) comprised of the composite material according to the second implementation is the same as the first implementation. Therefore, redundant description is herein omitted.

Third Implementation

Figure 7:
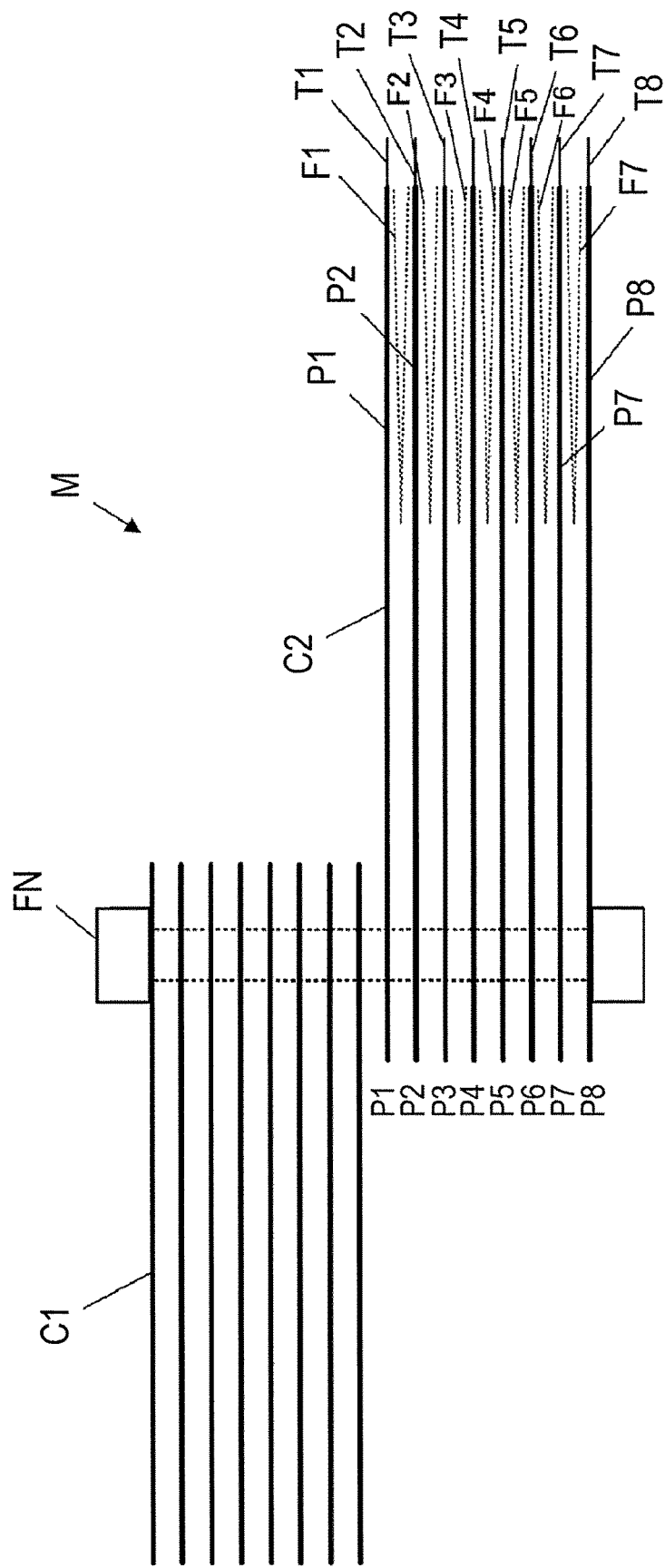
FIG. 7 illustrates a test specimen (test piece) which uses a composite material according to a third implementation.

FIG. 7 is a view illustrating a test specimen (test piece) made of a composite material according to a third implementation of the present disclosure. The composite material of this implementation is a fiber reinforced plastic, such as a carbon fiber reinforced plastic (CFRP), similar to the first implementation. As illustrated in FIG. 7, the test specimen M of this implementation is formed by laying up two composite material plates C1 and C2 so that end parts thereof are overlapped, and coupling the composite material plates with a metal fastener FN. Each of the composite material plates C1 and C2 are formed by laminating a plurality of prepregs. A method of forming an electrode part is the same as the first and second implementations, and is comprised of intervening metal sheets T1-T8 and mold releasing films F1-F7 between respective prepregs P1-P8. The mold releasing films are not limited to being folded in half.

Figure 8A:
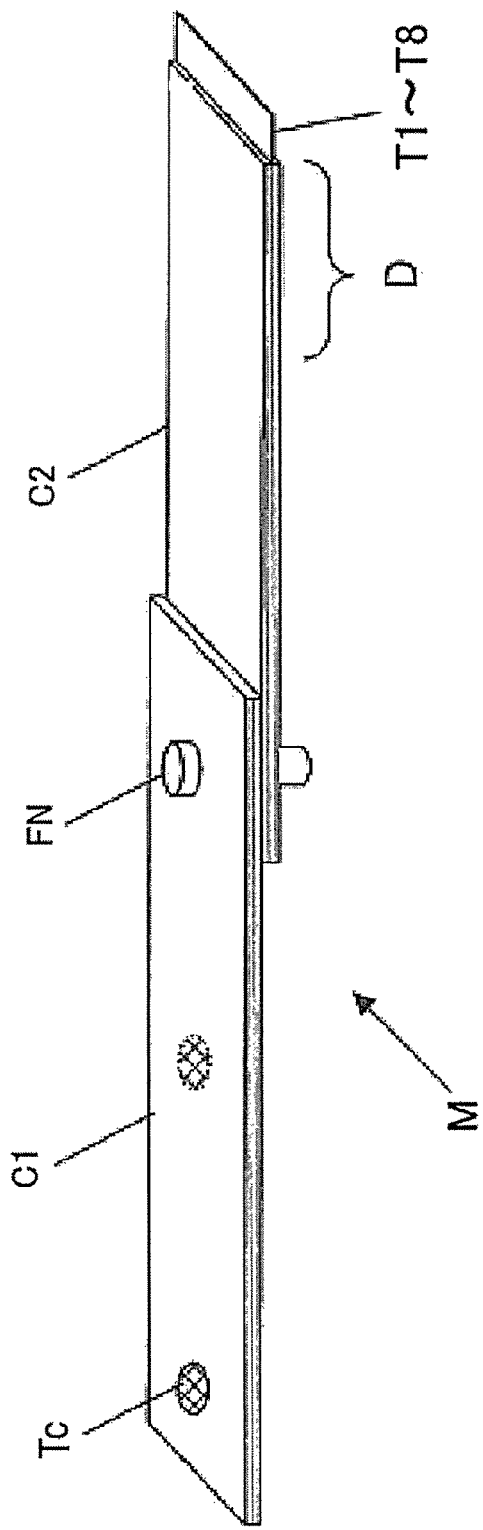
FIGS. 8A and 8B illustrate the entire configuration and a current measuring method of the test specimen (test piece) of the third implementation, respectively.
Figure 8B:
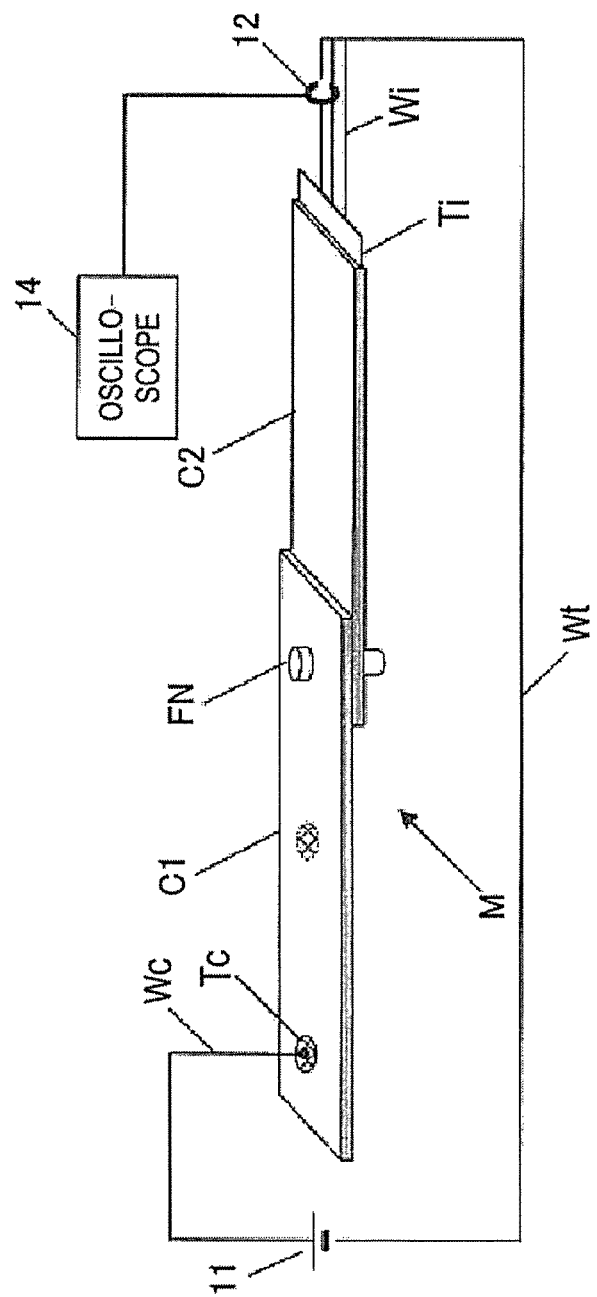

FIGS. 8A and 8B illustrate the entire structure of the test specimen (test piece) and a method of measuring current of the test specimen, according to the third implementation. As illustrated in FIG. 8A, the test specimen of this implementation is formed by laying up two strip-shaped composite material plates C1 and C2 so that their end parts are overlapped, and coupling the composite material plates C1 and C2 with the metal fastener FN. The other end of the composite material plate C2 (right-side end in FIGS. 8A and 8B) which is opposite from the coupled side is separated in layers by molding which uses mold releasing films etc. as described with reference to FIG. 7, only by a predetermined length D. Here, the mold release processing for layers is not applied to the composite material plate C1.

An electrode 10 as a current applying part is formed on the surface of an end part (left-side part in FIGS. 8A and 8B) of the composite material plate C1 opposite from the coupled side by partially sanding, applying silver paste, and sintering or plating, similar to the above-described implementation. Note that, the electrode 10 is not limited to be one formed on the surface of the composite material plate C1. For example, at the same position of the surface electrode illustrated in FIGS. 8A and 8B, an electrode pin (including a fastener) which penetrates the composite material plate C1 may be provided, or a plate-shaped electrode which entirely contacts an end face of the composite material plate C1 opposite from the coupled side may be provided.

As illustrated in FIG. 8B, in the test specimen M of this implementation, positive voltage is applied to the electrode part 10 on the surface of the end part of the composite material plate C1 from a direct current (DC) power supply 11 via a lead Wc. Further, end parts Ti of the layers of the composite material plate C2 are coupled to a negative electrode of the DC power supply 11 by leads Wi and Wt. Current flowing through the lead Wi is detected by a current detection element 12, and the detected current value is displayed on an oscilloscope 14. Here, the DC power supply 11, the current detection element 12, and the oscilloscope 14 constitute a current measuring device.

According to the implementation described above, currents flowing through the respective layers of the composite material plates which constitute the test specimen coupled by the fastener can be measured to derive the ratio etc. of the currents. Therefore, current measurements for a plurality of test specimens which are different in the fastener and processing conditions are performed to obtain a key to solve a propagation mechanism of the currents in directions including off-plate directions in the structure comprised of the plurality of composite materials coupled by the fastener based on the results of the measurements. Further, the form and diameter of the fastener, processing conditions, laminated structures of the composite materials, etc. which are effective for a thunder-proof can be found. Here, the term "processing conditions" as used herein includes parameters, such as types, rotating speeds, feed rates of tools, such as a drill bit, a drilling machine, used for forming holes.

According to the implementations of the present disclosure, the currents flowing through the respective layers of the composite material can be measured and, thus, it is possible to obtain the key to solve the propagation mechanism of the currents in directions including the off-plate directions, and find out the countermeasures against thunderstrikes and short-circuits. In addition, the contact resistance in the electrode parts can be lowered and the variation thereof can be reduced, homogeneous current can be applied from the electrode parts, and the currents flowing through the respective layers of the composite material can be measured more accurately. Further, according to the implementations of the present disclosure, it is possible to make with sufficient reproducibility and efficiency the composite material which is measurable of currents flowing through the respective layers and is provided with the electrode parts for applying currents to the respective layers. Further, according to the implementations of the present disclosure, it is possible to derive the current distribution state in the middle of actual use by inserting the metal sheets which serve as the electrodes in advance not only into the composite material as a test specimen but also in the composite material as a final product. In addition, a conduction (bonding) check of the product is also possible.

Note that, although the plate-shaped composite material plates C1 and C2 are illustrated in the above-described implementation, the present disclosure is not limited to the shape, but may be complicate shapes for typical structures of the composite material. Further, as illustrated in the figure by the dashed lines, a fastener may be provided at an intermediate position of the composite material plate. The electrode part 10 is illustrated as, but not limited to the current applying part in the above-described implementation. The current applying part may broadly include a portion where current is applied, and in an extreme sense, no processing may be applied to the surface of the composite material plate C1. For example, when carrying out a thunderstrike examination, the current measuring of the present disclosure can be performed by applying a discharge current onto the composite material plate C1 where no electrode part is particularly formed.

As described above, although the implementations of the present disclosure are described, the present disclosure is not limited to the implementations described above but may suitably be changed or modified without departing from the scope of the present disclosure. For example, although the fiber directions of the test specimen M may be the same for all the layers in the above-described implementation, the test specimen may have laminated layers which have different fiber directions alternately by 90 degrees, or the test specimen may have four layers which have different fiber directions respectively by 45 degrees. Further, the number of laminations is not limited to the eight layers. The pretreatment performed to the metal sheets before molding may be determined according to the type of metal to be used which constitutes the metal sheets, and sanding and/or etching suitable for the metal may be applied. Similarly, the etching agent used for the etching before coupling the lead to the electrode may be determined also according to the type of metal which constitutes the metal sheets, and is not limited to sulfuric acid. Although the fiber reinforced plastic in which the resin is reinforced with the conductive fibers is used as the composite material in the above-described implementation, composite materials in whose fibers are nonconductive and resin is conductive (i.e., a conductive resin or a resin where conductive material(s) are kneaded or mixed) may also be used. Further, composite materials which are comprised of conductive fibers and conductive resin may also be used.

The invention claimed is:

1. A composite material, comprising:
   laminated composite material sheets having conductivity, the laminated composite material sheets including at least a first sheet, a second sheet laminated on the first sheet, and a third sheet laminated on the second sheet, the first to third sheets having end parts;
   partitioning members, folded in half, including at least a first member and a second member,
     the first member being provided between the first sheet and the second sheet and extending in a longitudinal direction of the composite material sheets from the end parts of the first and second sheets for a determined length to separate the first and second sheets from each other,
     the second member being provided between the second sheet and the third sheet and extending in the longitudinal direction from the end parts of the second and third sheets for the determined length to separate the second and third sheets from each other; and
   metal sheets respectively provided to the end parts of the first to third sheets, each end part having a shape to pinch corresponding one of the metal sheets.

2. A composite material, comprising:
   laminated composite material sheets having conductivity, the laminated composite material sheets including at least a first sheet, a second sheet laminated on the first sheet, and a third sheet laminated on the second sheet, the first to third sheets each having a surface and an end part;

partitioning members, folded in half, including at least a first member and a second member, the first member being provided between the first sheet and the second sheet and extending in a longitudinal direction of the composite material sheets from the end parts of the first and second sheets for a determined length to separate the first and second sheets from each other, the second member being provided between the second sheet and the third sheet and extending in the longitudinal direction from the end parts of the second and third sheets for the determined length to separate the second and third sheets from each other; and metal sheets respectively joined to the surfaces of the first to third sheets at the end parts thereof.

3. A composite material, comprising:

laminated composite material sheets having conductivity, the laminated composite material sheets including at least a first sheet, a second sheet laminated on the first sheet, and a third sheet laminated on the second sheet, the first to third sheets having first end parts and second end parts;

partitioning members including at least a first member and a second member, the first member being provided between the first sheet and the second sheet and extending in a longitudinal direction of the composite material sheets from the first end parts of the first and second sheets for a determined length to separate the first and second sheets from each other, the second member being provided between the second sheet and the third sheet and extending in the longitudinal direction from the first end parts of the second and third sheets for the determined length to separate the second and third sheets from each other; and metal sheets respectively provided to the first end parts of the first to third sheets, each first end part having a shape to pinch corresponding one of the metal sheets, wherein the first to third sheets each have a strip shape with a different length from each other, and the first to third sheets are laminated so that second end parts where the partitioning members are not provided are aligned.

4. A composite material, comprising:

laminated composite material sheets having conductivity, the laminated composite material sheets including at least a first sheet, a second sheet laminated on the first sheet, and a third sheet laminated on the second sheet, the first to third sheets each having a surface, a first end part, and a second end part;

partitioning members including at least a first member and a second member, the first member being provided between the first sheet and the second sheet and extending in a longitudinal direction of the composite material sheets from the first end parts of the first and second sheets for a determined length to separate the first and second sheets from each other, the second member being provided between the second sheet and the third sheet and extending in the longitudinal direction from the first end parts of the second and third sheets for the determined length to separate the second and third sheets from each other; and metal sheets respectively joined to the surfaces of the first to third sheets at the end parts thereof, wherein the first to third sheets each have a strip shape with a different length from each other, and the first to third sheets are laminated so that second end parts where the partitioning members are not provided are aligned.

5. The composite material according to claim 3, further comprising a common lead coupling part to which a common lead that applies current to the composite material is electrically coupled, the common lead coupling part being provided in a part of the composite material where the composite material sheets are not separated.

6. The composite material according to claim 4, further comprising a common lead coupling part to which a common lead that applies current to the composite material is electrically coupled, the common lead coupling part being provided in a part of the composite material where the composite material sheets are not separated.

7. A composite material, comprising:

a first composite material sheets including at least a first sheet and a second sheet having conductivity, the second sheet being laminated on the first sheet;

a second composite material sheet being disposed to partially overlap with the first composite material sheet, the second composite material sheet including at least a third sheet and a fourth sheet having conductivity and end parts, the fourth sheet being laminated on the third sheet, the end parts being on a side opposite to a side where the second composite material sheet overlaps with the first composite material sheet;

a conductor penetrating both the first and second composite material sheets;

a partitioning member folded in half and provided between the third sheet and the fourth sheet of the second composite material sheet, the partitioning member extending in a longitudinal direction of the second composite material sheet from the end parts of the first and second sheets for a determined length to separate the third and fourth sheets from each other; and metal sheets provided to the end parts of the third and fourth sheets, each end part having a shape to pinch corresponding one of the metal sheets.

8. A composite material, comprising:

a first composite material sheets including at least a first sheet and a second sheet having conductivity, the second sheet being laminated on the first sheet;

a second composite material sheet being disposed to partially overlap with the first composite material sheet, the second composite material sheet including at least a third sheet and a fourth sheet each having conductivity, a surface, and an end part, the fourth sheet being laminated on the third sheet, the end parts being on a side opposite to a side where the second composite material sheet overlaps with the first composite material sheet;

a conductor penetrating the first and second composite material sheets;

a partitioning member folded in half and provided between the third sheet and the fourth sheet of the second composite material sheet, the partitioning member extending in a longitudinal direction of the second composite material sheet from the end parts of the first and second sheets for a determined length to separate the third and fourth sheets from each other; and metal sheets joined to the surfaces of the third and fourth sheets at the end parts thereof.

9. The composite material according to claim 7, wherein a common lead coupling part to which a common lead that applies current to the composite material is electrically coupled is formed in the first composite material.

10. The composite material according to claim 8, wherein a common lead coupling part to which a common lead that applies current to the composite material is electrically coupled is formed in the first composite material.

11. The composite material according to claim 1, wherein the composite material sheet contains conductive fibers.

12. A method of making a composite material, comprising:

forming prepreg pairs, each prepreg pair formed by pinching a metal sheet between two composite material prepregs having conductivity at one of end parts of the composite material prepregs in a longitudinal direction of the composite material prepregs so that the metal sheet is partially protruded from the end parts of the composite material prepregs;

laminating the prepreg pairs with a partitioning member being pinched between the end parts of the prepreg pairs at the one end, the partitioning member being folded in half for a predetermined length from the ones of the end parts of the composite material prepregs; and molding the laminated prepreg pairs by pressurizing and heating the laminated prepreg pairs.

13. The method of making the composite material according to claim 12, further comprising coupling one end of a lead to each of the protruded parts of the metal sheets from the end parts of the prepreg pairs at the ones of the end parts, after molding the laminated prepreg pairs.

14. A method of making a composite material, comprising:

laminating composite material prepregs having conductivity so that a metal sheet and a partitioning member are pinched between respective ones of end parts of the composite material prepregs in a longitudinal direction of the composite material prepregs, the partitioning member being folded in half for a predetermined length from the ones of end parts of the composite material prepregs; and molding the laminated composite material prepregs by pressurizing and heating the laminated composite material prepregs, wherein the laminating of the composite material prepregs includes joining the metal sheets to the ones of end parts of the composite material prepregs so that the metal sheets are at least partially exposed from the ones of the end parts.

15. The method of making the composite material according to claim 14, further comprising coupling one end of a lead to each of the exposed parts of the metal sheets from the ones of end parts of the composite material prepregs after molding the laminated composite material prepregs.

16. The method of making the composite material according to claim 12, further comprising, as a pretreatment, forming fine irregularity on the surfaces of the metal sheets using a predetermined etching agent, before forming the composite material prepregs.

17. The method of making the composite material according to claim 14, further comprising, as a pretreatment, forming fine irregularity on the surfaces of the metal sheets using a predetermined etching agent, before forming the composite material prepregs.

18. The method of making the composite material according to claim 12, wherein the composite material prepreg contains conductive fibers.

19. The method of making the composite material according to claim 14, wherein the composite material prepreg contains conductive fibers.

\* \* \* \* \*